Patented Nov. 27, 1945

2,389,605

UNITED STATES PATENT OFFICE 2,389,605

PROTEIN SHEET MATERIAL AND METHOD OF MAKING THE SAME

Francis Clarke Atwood, Newton, Mass., assignor to Atlantic Research Associates, Inc., Newtonville, Mass., a corporation of Delaware No Drawing. Application April 29, 1942,
Serial No. 441,050

7 Claims. (Cl. 106—142)

The present invention relates to protein sheet material and the method of preparing the same, and more particularly to the manufacture of thin, transparent, flexible casein films or sheets for use in the wrapping and packaging of articles of various kinds.

It has heretofore been suggested that proteins such as casein might be used in the preparation of sheet and film material, but as far as I have been able to ascertain, no one has heretofore successfully developed a casein composition and method for commercial manufacture therefrom of sheet and film materials having the desired characteristics. Prior protein films, for example, were seldom transparent, and if transparent when first prepared, soon became cloudy or milky in appearance. In addition, the prior films have been brittle and lack the necessary toughness required in thin sheet materials used for wrapping purposes and the like. Likewise attempts to overcome the above troubles by more recent investigators by suggesting the incorporation with the protein of various compounds including oils, plasticizers, etc., have also been unsuccessful. The plasticized films for example become brittle on aging and in addition become rancid and liberate disagreeable odors, making them commercially unsatisfactory. The art has long sought a protein composition and method for manufacturing therefrom sheets and films suitable for practical commercial application.

It is, therefore, an object of my invention to provide novel protein compositions possessing characteristics which render them adaptable for various industrial purposes and particularly for the manufacture of thin, transparent, flexible sheets, films, and the like.

It is another object of my invention to provide stable casein films which will remain transparent and flexible over long periods of time.

It is also another object of my invention to provide tough casein films which are odorless and do not become yellow and rancid on aging.

It is a further object of my invention to provide film forming compositions which may be applied directly to the articles to be coated.

It is still a further object of my invention to provide a process for preparing protein sheet, film and coating material adaptable for use in wrapping, packaging, and coating various articles.

Other objects of my invention will be apparent as the description hereinafter proceeds.

The starting material of my invention is a protein and preferably a protein which is water-insoluble, alkali-soluble, and acid-precipitable, such as the caseins derived from milk, soya beans, and other sources.

The first step in my process is the preparation of substantially pure casein substantially free from butter fats and oils, inorganic salts, including calcium salts, milk sugars including lactose and water soluble proteins including the lactoflavins. I have found that acid-precipitated caseins having a pH value below 4.7 prepared, for example, by the Chappell process described in Patent No. 1,992,002, patented February 19, 1935, or the Clickner process described in Patent No. 2,044,282, patented June 16, 1936, are potential sources of casein for producing films having desired properties.

I have discovered that particularly good films are obtained using casein made by treating skim milk containing calcium caseinate with a strong alkali such as caustic soda, before addition of the acid and the precipitation of the protein. Casein prepared by this method, known as the "alkali-acid method," contains an extremely small percentage of calcium salts including calcium caseinate and associated calcium phosphate, the lime salt being removed as a soluble calcium salt when hydrochloric acid, lactic acid or like acids are used as the precipitant. In the ordinary precipitating process, without the prior addition of the alkali, the precipitated protein in the absence of extreme caution ordinarily contains a relatively high percentage of calcium caseinate or occluded calcium phosphate.

Improved casein for use in my invention may also be prepared by the "acid-alkali method" by employing an excess of acid to bring the pH value down to around 3 to 4 and then neutralizing with caustic.

Another method of preparing casein particularly suitable for use in the manufacturing of transparent protein film and the like consists in instantaneous precipitation of casein curd with vigorous mechanical action. I have discovered that the resulting casein from this process is made up of fine units which insures a minimum of occluded or absorbed calcium salts.

In addition I have discovered that casein substantially free from calcium may be prepared by washing the curd with calcium solvents such as sodium hexameta phosphate, sodium lauryl sulphonate, etc. I have also found that calcium salts present in casein curd may be precipitated by washing the curd with water containing a small amount of oxalic acid or soluble oxalate salt, so as to form the insoluble calcium oxalate salt which may be removed subsequently by filtration.

I have also discovered that acetic acid precipitated and acetic acid washed caseins are particularly suitable for use in my invention. I have further discovered that casein when subjected to a washing operation with acids or solvents, should be washed immediately after precipitation and that the best results are obtainable when the moist casein curd is in finely divided form.

It is possible to remove the salts, sugars, butter fats and oils and water soluble lactoflavin and prepare substantially pure casein by thoroughly washing precipitated casein in water. The washing processes, however, in use heretofore employing cold water, have been found to be commercially impractical, and this is particularly true when the ordinary casein curd composed of large particles is subjected to a washing operation. The resulting products remained contaminated after washing and did not produce uniformly good films. I have discovered by thoroughly washing precipitated caseins preferably in hot water at a temperature of about 100°–120° F. that it is possible to prepare substantially pure casein. I have also discovered that putting casein suspended in water through a loosely set colloid mill accomplishes a great deal more washing resulting in a clearer film than is obtainable by the ordinary soaking of casein in water.

The substantially pure casein satisfactory for use in accordance with my preferred invention should not contain over 1 per cent water soluble or water removable material. While it is preferred to wash at elevated temperatures, the temperatures employed should not be so high as to cause agglomeration of the casein. The casein should be washed with fresh water and preferably a soft water until the wash water is free from solid material, color and odor.

In accordance with one of my preferred processes I employ moist undried casein curd which has been treated with a plumping agent as described in my co-pending application, Serial No. 169,469, filed October 16, 1937, for "Stabilized protein curd," granted on March 2, 1943, as Patent No. 2,312,467. The stabilized curd containing a plumping agent is readily dispersible and has been found to produce superior films than ordinary caseins which have been subjected to a drying operation. I have also discovered that the moist stabilized curd may be improved on aging due, it is thought, to the presence of lactic acid or other acids which form soluble mono-calcium caseinate which in turn may be readily removed on washing. The acid content of the curd will govern the optimum time of aging and result obtained.

In addition to the above a specially treated casein subjected to a controlled rennet or enzyme treatment so as to form a para caseinate may be employed to advantage in my invention. Ordinarily it is desirable to treat the rennet casein with an acid such as lactic acid to form monocalcium para-caseinate which is soluble in common salt solutions.

The use of substantially pure casein is necessary for the manufacture of films having the desired characteristics as I have discovered that butter oils and fats, as well as milk mineral salts and particularly lactose sugars and lactoflavin proteins, present in ordinary commercial casin, produce cloudy films having a milky appearance which yellow readily and liberate offensive odors.

My investigations show that for the production of good films the casein should contain not more than 1 per cent of natural butter oils and/or fats and should have an ash content of not over 2 per cent (determination by calcium acetate method). As the ash content is directly related to the proportion of calcium caseinate or associated calcium phosphate present in the casein, a casein high in calcium salts necessarily has a correspondingly high ash content. My investigations have also shown that as milk derives its white color largely from the presence of calcium caseinate, the casein used to insure stable, transparent films should not contain over 1 per cent of calcium as calcium caseinate.

In accordance with my preferred process the substantially pure casein containing not over 1 per cent of oils and/or fats, not over 2 per cent ash content, and not over 1 per cent of calcium as calcium caseinate (all percentages on a dry basis) is swollen by agitation with a substantial quantity of water at about 110° F. A substantial quantity of a soluble alkali, ammonia or alkyl amine soap of a higher vegetable or animal fatty acid is then added with continued agitation and the temperature raised to about 140° F. until the casein completely disperses. The suitable alkali soaps include both the sodium and potassium soaps, while suitable amine soaps include, for example, the mono-, di- and tri-methyl, ethyl, propyl amines, and the hydroxy amines including the mono-, di- and tri-ethanol, propanol, and butanol amine soaps. My invention also includes the use of mixed amine soaps in which the amine groups contain unlike alkyl groups.

I have discovered that the plasticity of the films are increased when the fatty acid part of the soap used is high in oleic acid, linoleic acid, ricinoleic acid, or other low melting fatty acids and low in high melting fatty acids, such as stearic, oleostearic, and palmitic acids. Examples of fat and oils high in potential oleic acid, linoleic acid, or other desirable acids and suitable for use in my invention include lard and sesame, corn, cotton seed, soy, castor, tea seed, peanut, almond, ground nut, rape seed and olive oils or mixtures of the same. In most cases the fatty acids may be improved for use in my invention by removal of substantially all saturates and high melting acids. In accordance with one of my preferred processes the double bonds of the unsaturated acids are partially satisfied by a ketenizing or acetylating treatment, hereinafter described, which tends to reduce residual odor of the oil and consequently the residual odor of the finished film or sheet.

The soap added to the swollen casein as a general rule is pre-formed, although in some instances the soap may be formed in situ by adding the alkali or alkyl amine to the mixture of casein and fatty acid. The order of addition of the ingredients is important as I have found inferior films are produced when the free alkalies or alkyl amines are mixed directly with the protein in the absence of the fatty acid. A possible explanation of this phenomenon may reside in the fact that as casein is an amphoteric material having an isoelectric point at a pH value of about 4.6, it forms a stable salt when mixed directly with a strong base including alkalies and alkyl amines, the resulting protein solution or dispersion being inferior for use in the manufacture of transparent films. I have also found that the presence of the casein in the form of the stable alkali-casein salt makes it correspondingly difficult to thereafter tie in a plasticizer with the reactive groups of the casein molecule.

The amount of soap necessary to disperse or dissolve the casein depends largely on the particular soap employed as well as the casein employed. Dried or denatured casein, for example, takes more soap to complete dispersion than does the undried casein containing a plumping agent described in my co-pending application above referred to. Ordinarily 20 to 40 per cent soap based on the weight of the casein has been found sufficient to give complete dispersion. The casein dispersion should preferably have a pH value below 7.5 and ordinarily sufficient soap is added to give a clear, well dispersed solution. In making up the soap composition an excess of alkaline or acid material may be added, depending upon the characteristics desired in the final film. In one of my preferred processes, I employ a fatty acid to triethanolamine ratio of 1, although the ratio may vary from 0.5 to 3.6.

To the casein-soap solution is next added a small amount of an inhibitor or anti-oxidant such as diphenylamine, hydroquinone, pyrogallic acid, stannous oleate, sodium stannite, sodium sulphite, etc. In practice, it has been found desirable to suitably dissolve the inhibitor to insure satisfactory dispersion in the casein solution. The addition of the antioxidant has been found desirable as it aids in keeping the film clear and flexible and free from disagreeable odors, particunlarly when unsaturated fatty acids which have not received a ketenizing treatment are used in the soap composition. I have found that the amine retarders are preferred when my dispersions have a pH value on the acid side, while the phenolic retarders are preferred when operating with neutral or alkaline dispersions.

The viscosity of the dispersion may be adjusted by changing the temperature or by the addition of water to produce the desired result, for example, to control thickness of the film to be made, to conform to or meet the particular requirements of the film machine employed, etc. Water or other diluent may be added from time to time to keep the viscosity of the dispersion uniform. In addition, the solution should be agitated from time to time to insure complete dispersion.

The aging or cooking of the casein solution or dispersion at an elevated temperature before casting the films has been found to improve the characteristics particularly the flexibility of the final films. A temperature of 150°-220° F. for one to six hours is ordinarily sufficient to produce the desired result. High temperatures, e. g., over 220° F. should ordinarily be avoided as they tend to cause the casein to "liver" or jell. However, cooking for short periods of time at temperatures up to 240° F. have been found satisfactory for special purposes when carried out in autoclave. During the heat treatment the free fatty acid of the soap composition reacts with the amphoteric casein molecule and appears to form a stable, resin-like product. In addition, aging or ripening at lower temperatures for 24-72 hours by storing the prepared solution preferably in a jacketed container to maintain uniform temperature will result in a stronger and more desirable film with many compositions. I have also found the use of non-odorous, non-poisonous compositions of high phenol co-efficient to inhibit mold growth and allow ripening of the solution prior to casting to be frequently desirable, particularly if formaldehyde is not used as a hardening agent. As examples I have found salts of the halogenated phenols such as the sodium salt of pentachlorophenol to be particularly adaptable for use in my invention.

The following example will serve for illustrative purposes. About 25 pounds of substantially pure casein of about 30 mesh and preferably obtained by one of the methods previously described above, is added to a kettle containing about 117 pounds of water. The casein-water mixture is agitated and the temperature raised slowly to about 110° F., which causes the casein to swell. In a separate container sesame fatty acids and triethanolamine are heated and stirred in the usual manner in the correct proportions to form the desired triethanolamine-fatty acid soap composition. In some cases, I prefer to use 12½% amine and 25% fatty acid based on the weight of the casein, while in other cases I prefer to employ balanced molecular values. I have discovered that in the formation of the soap low temperatures or temperatures below 150° F. should be used. The soap reaction mixture contains little water and high temperatures cause a break down resulting in the formation of a soap composition giving poorly plasticized films. About 8 or 10 pounds of the pre-formed fatty acid soap composition is then added to the swollen casein-water mixture, the temperature being raised slowly to about 140° F. with continued agitation until complete dispersion. The pH value of the solution should preferably remain on the acid side, although it may go up to 8.5, the point at which phenolphthalein turns pink. An anti-oxidant such as a solution containing 0.5 per cent pyrogallic acid based on the weight of the casein may next be added to the dispersion, if desired. In my preferred process the casein dispersion is continually agitated and is allowed to age or ripen for about 1 to 4 hours at a temperature of about 160° F. The casein dispersion is then filtered through a filter press with a filter aid, e. g., diatomaceous earth in the usual manner.

It has been found that the presence of a small amount of an anti-foaming agent, for example, the partly water-soluble alcohols, esters, ethers and ketones, aids in the filtering of the dispersion as well as in the formation of improved films. For example, about 0.5 to 10 per cent butyl alcohol or hexanol (based on the volume of the dispersion) has been found to keep down foaming of the dispersion and the formation of "birdseyes" in the film. The use of alcohols in foam abatement forms the subject matter of my Patent 2,220,700, November 5, 1940.

To the aged casein dispersion is next added about 1 to 2 per cent (based on the weight of the casein) of a hardening or tanning agent such as formaldehyde and/or chrome compounds and water is then added to obtain the desired viscosity and the mixture thoroughly agitated to insure uniform dispersion. The casein dispersion is then ready for the film machine, and preferably a machine of the type described in the co-pending application of Edouard M. Kratz, Serial No. 229,509, filed September 12, 1938, now Patent No. 2,346,764, granted April 18, 1944.

My investigations have shown that for certain purposes the tri-hydroxy amines such as commercial triethanolamine and preferably a commercial mixture low in mono- and diethanolamines to be the preferred alkaline material for use in forming the dispersing or plasticizing soap. My investigations have also shown that for certain purposes the higher fatty acids containing two double bonds such as linoleic acid to be preferred for making films in accordance with one phase of my invention. For example, films made with triethanolamine-linoleic acid soap compositions have been found to be particularly stable at low humidities. My investigations have also shown that a preliminary treatment of the casein with 1 to 2 per cent ammonium oxalate or sodium hexa meta phosphate before addition of the soap to be desirable. This treatment prevents the formation of the insoluble calcium soaps, and makes possible the production of superior films. I have further found that a pre-tanning treatment obtained by adding a small portion of a chrome tanning agent to the casein during dispersion to be beneficial. In addition, dispersing the casein in a colloidal mill or the like has been found advantageous in certain cases as the films produced therefrom are very tough and clear and have a very high brilliancy. If desired, when dispersing in a colloidal mill less dispersing agent may be used than is ordinarily required when dispersing in the usual manner.

When the sheets or films are to be used in the winter or other seasons of the year when the humidity or moisture content in the air is extraordinarily low, a small amount of a hygroscopic polyhydric alcohol such as glycerine or glycol is generally added to the casein during the swelling treatment to assist in maintaining the required flexibility in the finished product. I have discovered that it is preferable to add the polyhydric alcohol at the beginning of my process before the addition of any alkali or alkaline material. I have also discovered that the casein and polyhydric alcohol react when agitated at a temperature of about 110° F. in the absence of alkalies but with suitable catalysts as sodium fluoride, and form a complex resinous composition. The presence of the reacted or combined polyhydric alcohol maintains the moisture content in the finished sheet and keeps the sheet or film flexible. I have further discovered that substantially no reaction takes place between the protein and polyhydric alcohol in the presence of water and at low temperatures when the polyhydric alcohol is added after the alkali or alkaline material due to the formation of the stable relatively inactive alkali-casein salt. In the latter case the unreacted or uncombined polyhydric alcohol tends to weep or sweat out of the sheet allowing the sheet to become tacky and then brittle and consequently unsatisfactory. The polyhydric alcohol is not needed in summer and other seasons of the year when the humidity is normal or high.

I have discovered that traces of the heavy metals including copper, iron and manganese catalyze oxidation of the fatty acids and the protein causing rapid yellowing of the protein films. In addition the oxidation of the protein compositions causes the films to become brittle and develop a disagreeable odor making the compositions unsatisfactory for commercial application. The ingredients available on the market for use in my compositions unless special precautions are taken ordinarily have an active copper content of about 10 parts in 1 million and films made therefrom have been subject to the above disadvantages. I have discovered that the copper present in ionized form should not be over 1 part in 1 million and preferably should be less than 1 part in 20 million. The active iron should not be present in over 1 part in 200 thousand. The raw ingredients used in my compositions should be free from heavy metals and the equipment or apparatus used in preparing the compositions for use as well as the apparatus used for casting the films should be such as do not contaminate the final protein compositions. The raw ingredients and/or the final protein dispersions may be treated with compounds such as the sulphides or complex cyanides, diethyl-dithio-carbonates, etc., which precipitate or render inactive the ionized heavy metals.

In practice I have found stainless steel belts or chrome-plated metal belts preferred for casting purposes. I have also found that the best results are obtained when the revolving metal belt is subjected to a buffing treatment prior to the application of the casein dispersion. I have discovered that a buffing material comprising a major proportion of a mild abrasive or polishing agent and minor proportions of alkali soaps of higher fatty acids and inert amorphous, semi-solid hydrocarbons are particularly suitable for use with my compositions when a stainless steel casting belt is employed. The following example of a buffing material giving excellent results will serve for illustrative purposes:

Example

| | Per cent |
|---|---|
| Silica, e. g., diatomaceous earth, Missouri mud, alundum (300 mesh) | 70 |
| Sodium stearate | 20 |
| Unsaponifiable petrolatum | 10 |

The buffing material which may be applied by the ordinary buffing wheel or buffer polishes the metal belt and at the same time applies a molecular resilient film of an elastic, adhesive, non-drying and non-reactive partitioning agent or substrata which holds the casein film on the surface of the belt but permits it to be readily stripped or peeled off when dried. The soap which may be replaced by a wetting out agent such as sodium lauryl sulphonate aids in the formation of films of uniform thickness. Lanolin containing buffing compositions have also been found adaptable for use in casting protein films on metallic surfaces. The films cast in accordance with my invention using a buffing material of the type described are free from streaks or other markings which have heretofore restricted the use of metallic belts in casting transparent films.

I have discovered that the protein films may be tanned and toughened and made resistant to aging by treatment with unsaturated bodies such as the ketens. Ordinarily I prefer to treat the films after casting with a mineral spirit solution of a keten such as represented by the following formula: $CH_2=C=O$, or by gassing the film directly with keten gas. If desired, the fatty acids used in my preferred compositions may be subjected to a keten treatment prior to soap formation and dispersion. However, I have found it undesirable to subject the protein to a complete keten treatment prior to dispersion as the completely ketenized protein is not readily dispersible. The keten treatment of the fatty acids and/or films makes possible a tough moisture resistant portein film particularly resistant to yellowing and odor formation ordinarily caused by oxidation.

In drying the protein films I have also discovered that drying under tension and particularly longitudinal stress improves the characteristics of the final film.

The films produced in accordance with my invention may be coated with various water-proofing compositions including phenolic and modified phenolic resins, glyptal and modified glyptal resins, urea-formaldehyde resins, etc. In practice, I have discovered that the acrylic acid resins are particularly adaptable for coating transparent casein films. I have also discovered that nitro-cellulose lacquers containing bleached dewaxed shellac are particularly good compositions for coating casein films or sheets. The coating compositions are ordinarily dissolved in a volatile organic solvent and are applied in solution form to cast casein films in the usual manner.

In addition to the above, I have found that coating compositions comprising rubber polymers (Pliolite) and wax or ketenized rubber and wax are adaptable for use with my casein films. I have found that the rubber-wax coating when used with casein should be substantially free from halogens such as chlorine, and that amorphous wax is preferred over the crystalline paraffin waxes. Of great importance, I have discovered that the coated films should contain from 8 to 20 per cent moisture as films containing less than the minimum amount of moisture are brittle while films having a moisture content over 20 per cent tend to be soft and rubbery, although these rubbery properties may be desirable for some purposes. Thus it will be seen that it is essential to have the correct amount of moisture in the casein film before sealing the film with the water-proof coating. The amount of water in the film may be controlled by controlling the composition of the casein dispersion, by controlling the conditions under which the films are dried and by controlling the humidity conditions under which the films are stored prior to coating. Ordinarily it is preferred to coat the films immediately after fabrication, before the films have an opportunity to change their moisture content.

In view of the necessity of retaining an 8 to 20 per cent moisture content in the casein films, I have discovered that the volatile organic solvents used to dissolve the coating compositions, including the rubber polymer-wax coating, should be selected from the group of solvents which are not miscible with water. For example, I have found that volatile solvents such as alcohol, acetone and the like in which water is soluble, tend to remove the moisture from the protein films when the coating solutions are applied. In addition, I have found that the coating solutions containing water soluble solvents tend to bring the soap dispersing or plasticizing agent to the surface of the film and break up the casein-soap complex. In accordance with my invention I employ a volatile hydrocarbon or mineral spirit solvent which is not miscible in water.

In some cases I have found it desirable to apply a thin coating of moisture proofing composition to the casting belt before casting the casein solution on the belt. The two layers when dry are removed from the belt as a unit. When following this process the upper surface of the casein film may also be moisture proofed by application of a water-proofing composition in the usual manner at the time of removal, thus avoiding a separate coating operation.

It will be understood by those skilled in the art that the casein dispersions of my invention may be used to coat articles directly by dipping, spraying, etc., as well as by casting into films for wrapping and packaging purposes. It will also be understood by those skilled in the art that my casein films may be used without water-proof coatings. For some purposes, however, I have found it desirable to coat one side of the film while for other purposes I have found it desirable to envelop or coat the casein films on both sides. It will also be understood that my films may be used in laminated sheet form or used in laminated sheets containing various type plies including paper, cloth, Celluloid, etc. It will be further understood that various pigments and dyes, including lithopone, bronze powders, aniline colors, etc., may be incorporated with my casein dispersions when a color or decorated film or sheet is desired.

All modifications coming within the true spirit and scope of my invention are intended to be covered by the claims annexed thereto.

This application discloses subject matter in common with my earlier application Serial No. 193,734, filed March 3, 1938.

I claim:

1. A method of preparing protein sheet, film and coating compositions, which comprises dispersing casein in an aqueous solution containing an alkylamine higher fatty acid soap the fatty acid portion of which comprises a major portion of unsaturated fatty acids to form a uniform casein dispersion, aging said dispersion at a temperature of approximately 150 to 220° F. for several hours and adding a casein hardening agent to the aged dispersion.

2. A method of preparing transparent films which comprises dispersing a substantially pure casein in an aqueous solution consisting essentially of an ethanolamine higher fatty acid soap to form a uniform casein dispersion, aging said dispersion at a temperature of about 150°–220° F., adding a casein hardening agent to said dispersion and casting said dispersion into a film, the fatty acid of the fatty acid portion of said soap being substantially free from saturated and high melting fatty acids.

3. The method of preparing transparent and flexible protein films, which comprises agitating a substantially pure casein-water mixture at a temperature of about 110° F., adding to the mixture a pre-formed triethanolamine-higher fatty acid soap, raising the temperature of the aqueous casein-soap mixture to about 140° F. with continued agitation to form a uniform casein dispersion, ripening the dispersion at a temperature of approximately 150 to 220° F. for several hours, adding to the ripened dispersion a casein hardening agent and casting said dispersion into films, the fatty acid portion of said soap consisting of a major proportion of low melting fatty acids containing two double bonds.

4. In a process of producing transparent sheet material, in which process a hardened casein dispersion is cast in the form of a film, the steps which comprise preparing said dispersion by heating and agitating casein in an aqueous solution containing an alkylamine higher fatty acid soap the fatty acid portion of which comprises a major portion of unsaturated fatty acids to form a uniform casein dispersion, aging said dispersion at a temperature of approximately 150 to 220° F. for several hours, and adding a casein hardening agent to the aged dispersion.

5. In a process of producing transparent sheet material, in which process a hardened casein dispersion is cast in the form of a film, the steps which comprise preparing said dispersion by agitating a substantially pure casein-water mixture at a temperature of about 110° F., adding to the mixture a preformed ethanolamine-higher fatty acid soap the fatty acid portion of which comprises a major portion of unsaturated fatty acids, raising the temperature of the aqueous casein-soap mixture to about 140° F. with continued agitation to form a uniform casein dispersion, ripening the dispersion at a temperature of approximately 150 to 220° F. for several hours, and adding a casein hardening agent to the ripened dispersion.

6. A process of producing transparent sheet material which comprises casting a casein dispersion in the form of a film, said dispersion having been prepared by heating and agitating casein in an aqueous solution containing an alkylamine higher fatty acid soap the fatty acid portion of which comprises a major portion of unsaturated fatty acids to form a uniform casein dispersion, aging said dispersion at a temperature of approximately 150 to 220° F. for several hours, and adding a casein hardening agent to the aged dispersion.

7. A process of producing transparent sheet material which comprises casting a casein dispersion in the form of a film, said dispersion having been prepared by agitating a substantially pure casein-water mixture at a temperature of about 110° F., adding to the mixture a preformed ethanolamine-higher fatty acid soap the fatty acid portion of which comprises a major portion of unsaturated fatty acids, raising the temperature of the aqueous casein-soap mixture to about 140° F. with continued agitation to form a uniform casein dispersion, ripening the dispersion at a temperature of approximately 150 to 220° F. for several hours, and adding a casein hardening agent to the ripened dispersion.

FRANCIS CLARKE ATWOOD.